United States Patent
Corduneanu et al.

(10) Patent No.: US 6,678,805 B1
(45) Date of Patent: Jan. 13, 2004

(54) STRUCTURE ORGANIZATION FOR IMPROVED CACHE PERFORMANCE

(75) Inventors: Adrian Dumitru Corduneanu, Cambridge, MA (US); Vinod K. Grover, Mercer Island, WA (US); Richard Emil Ladner, Seattle, WA (US); Simon M. Meacham, Seattle, WA (US); Kevin James Zatloukal, Kenmore, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/578,774

(22) Filed: May 25, 2000

(51) Int. Cl.[7] .............................................. G06F 12/00
(52) U.S. Cl. ........................ 711/154; 711/118; 711/170; 712/217
(58) Field of Search ................................. 711/118, 154, 711/156, 170; 712/217

(56) References Cited

U.S. PATENT DOCUMENTS 5,889,993 A * 3/1999 Kroeger et al. ............... 714/27

OTHER PUBLICATIONS

Temporal–based procedure reordering for improved instruction cache performance. Kalamationos, J.; Kaeli, D.R.; 4th International Symposium on High–Performance Computer Architecture, 1998. Page(s): 244–253.*

Predictive sequential associative cache. Calder, B.; Grunwald, D.; Emer, J.; High–Performance Computer Architecture, 1996. Proceedings., Second International Symposium on , 1996. Page(s): 244–253.*

Calder, B., et al., "Cache–Conscious Data Placement", *Proceedings of the 8th International Conference on Architectural Support for Programming Languages of Operating Systems (ASPLOS)*, pp. 139–149, (Oct., 1998).

Chilimbi, T.M., et al., "Cache–Conscious Structure Definition", *Proceedings of the ACM SIGPLAN '99 Conference on Programming Languages Design and Implementation (PLDI)*, pp. 13–24, (May, 1999).

Chilimbi, T.M., et al., "Cache–Conscious Structure Layout", *Proceedings of the ACM SIGPLAN '99 Conference on Programming Languages Design Implementation (PLDI)*, pp. 13–24, May, 1999, pp. 1–12.

Grunwald, D., et al., "Improving the Cache Locality of Memory Allocation", *Proceedings of the ACM SIGPLAN '93 Conference on Programming Language Design and Implementation (PLDI)*, pp. 177–186, (1993).

Kistler, T., et al., "Automated Layout of Data Members for Type–Safe Languages", *Technical Report No. 98–22, Department of Information and Computer Science, University of California*, pp. 1–15, (May 1998).

Kistler, T., et al., "The Case for Dynamic Optimization", *Technical Report No. 99–21, Department of Information and Computer Science, University of California*, pp. 1–21, (May, 199).

(List continued on next page.)

*Primary Examiner*—Matthew Kim
*Assistant Examiner*—Matthew D. Anderson
(74) *Attorney, Agent, or Firm*—Merchant & Gould PC

(57) ABSTRACT

A method, apparatus, and software are disclosed for modelling access behavior to a cache memory using trace data collected during execution of an application. The model thus obtained is used to improve cache performance by reordering constituent members of data structures so as to improve the cache hit rate.

87 Claims, 5 Drawing Sheets

OTHER PUBLICATIONS

Panda, P.R., et al., "Memory Data Organization for Improved Cache Performance in Embedded Processor Applications", *ACM Transactions on Design Automation of Electronic Systems*, vol. 2, No. 4, pp. 384–409, (Oct., 1997).

Romer, T., et al., "Instrumentation and Optimization of Win32/Intel Executables Using Etch", *Proceedings of the USENIX Windows NT Workshop*, pp. 1–7, (Aug. 11–13, 1997).

Srivastava, A., et al., "ATOM, A System for Building Customized Program Analysis Tools", *ACM SIGPLAN Notices, 29 (6)*, pp. 196–205, (Jun. 1994).

Truong, D.N., et al., "Improving Cache Behavior of Dynamically Allocated Data Structures", *Proceedings of the Conference on Parallel Architectures and Compilation Techniques*, pp. 322–329, (Oct. 1998).

* cited by examiner

STRUCTURE ORGANIZATION FOR IMPROVED CACHE PERFORMANCE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2000, Microsoft, Inc.

FIELD OF THE INVENTION

The invention relates generally to data optimization techniques. More particularly, the invention relates to the organization of data structures in cache memory.

BACKGROUND

Application performance, e.g., the speed at which a software application runs, depends on several factors. One of these factors is the speed with which data is transferred into and out of the system's memory. To improve data transfer speeds, many applications use data caching techniques to provide fast access to frequently used data. Cache memory includes fast static random access memory (SRAM) devices that move data to and from the CPU more rapidly than the main memory. Using cache memory reduces the amount of time the CPU is idle while it waits for data.

Because memory latency continues to grow relative to processor speed, the cache performance of programs has become an important consideration for system designers, compiler designers, and application programmers alike. Cache memory is organized into units known as lines. A line is the unit of memory that is moved into or out of the cache as the result of a memory access. Typically, lines are 32 or 64 bytes, so several data items can be placed on the same line. One way to reduce cache misses and thereby improve cache performance is to place data items that are often accessed together on the same line. If one such item is accessed shortly after another and neither is in the cache, then two cache misses can be reduced to one if the data are relocated to the same line. In the C and C++ programming languages, compilers layout the members of structures in the order specified in the declaration, respecting the alignment constraints of the members. If a structure spas more than one line, performance may be improved by reordering the members of the structure so that those members that are accessed closely in time are located on the same line.

There have been some approaches to reordering the members of structures. Some such approaches use an analysis technique known as a field affinity graph to describe how often two members or fields of a structure are accessed closely in time. Certain other approaches use an analysis technique known as a temporal relationship graph, which has a similar objective to a field affinity graph. In both of these approaches, the nodes of the graph are weighted with nonnegative numbers, where a large weight indicates that the members at the ends of the edge are often accessed closely in time. As a result, an ordering of the members of the structure corresponds to a clustering of the nodes of the graph where the members in each cluster are placed on the same line. The clusters are constrained so that the members of each cluster can actually fit on the same line. A good ordering, then, corresponds to a clustering where the sums of the weights of edges within clusters is maximized or, equivalently, the sums of the weights of edges between clusters is minimized. The field affinity graph and the temporal relationship graph differ in how the weights are determined. Further, the clustering algorithms used in these methods differ. In particular, those approaches that use the field affinity graph tend to use a greedy bottom-up approach to clustering, while those that use the temporal relationship graph tend to use a top-down global optimization approach. While both types of approaches yield good results, neither optimally solves the problem of reordering the members of structures to improve cache performance.

SUMMARY OF THE INVENTION

To improve the cache performance of programs, an analytical model known as a member transition graph is used to model access behavior to structures to determine whether and how members of the structures should be reordered. The member transition graph models the behavior of the program's accesses to members of structures and the way in which the order of these members affects the number of cache misses. Trace data is used to calculate transition probabilities and cache line survival probabilities for each pair of members in the member transition graph. The member transition graph is then defined as a Markov-type model using these calculated probabilities. In addition, the member transition graph is used to simulate the effects of hypothetical reorderings of structure members on cache performance to determine the potential benefit of such reorderings. In one particular implementation, the model is used to define the cache miss rate for a hypothetical reordering by solving a system of linear equations. By finding an ordering that minimizes the cache miss rate, cache performance can be optimized.

According to one particular implementation of the present invention, cache access behavior of an application is characterized by collecting memory access information relating to the memory locations accessed within a cache memory while the application is being executed. The memory access information also relates to data objects that correspond to the accessed memory locations. Transition probabilities and survival probabilities are then determined based on the collected memory access information.

Another implementation is directed to a method for selecting an ordering of members of a data structure residing on cache lines in a cache. The method includes collecting trace data while an application is being executed. This trace data includes addresses corresponding to locations accessed within the cache during execution of the application. The collected addresses are associated with the members of the data structure. Transition and cache line survival probabilities are determined at least in part as a function of the plurality of collected addresses. A member transition model is then constructed as a function of the transition probabilities and the cache line survival probabilities. The member transition model is made of nodes connected by edges. Each node represents a distinct member of the data structure. The member transition model is used to select an ordering of the members from a plurality of possible orderings of the members.

Still other implementations include computer-readable media and apparatuses for performing these methods. The above summary of the present invention is not intended to describe every implementation of the present invention. The figures and the detailed description that follow more particularly exemplify these implementations.

DETAILED DESCRIPTION

In the following detailed description of various embodiments reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
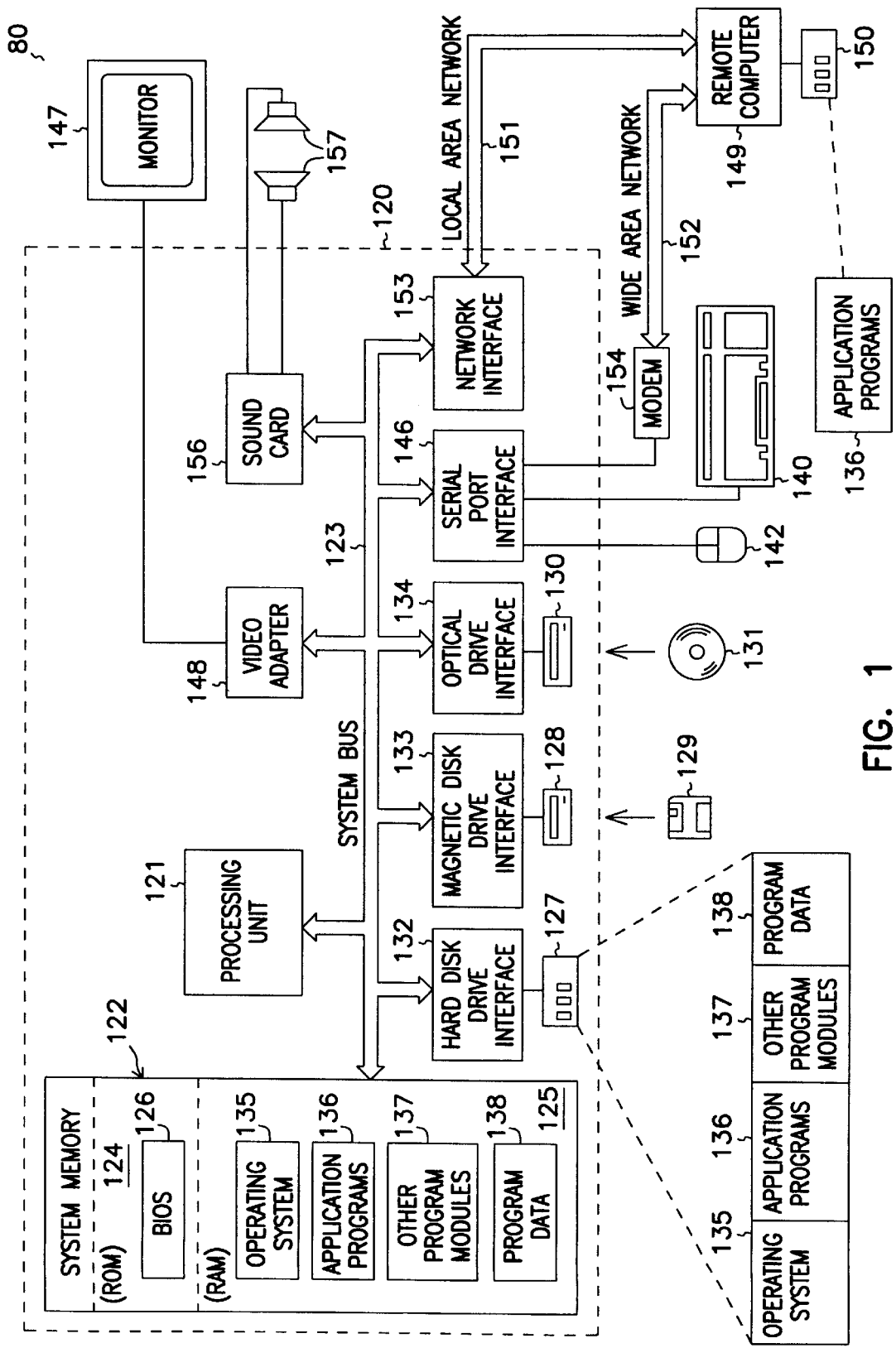
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 120, that includes processing unit 121, a system memory 122, and a system bus 123 that operatively couples the system memory 122 and other system components to processing unit 121. There may be only one or there may be more than one processing unit 121, such that the processor computer 120 comprises a single central-processing unit (CPU), or a plurality of processing units, commonly referred to as a parallel processing environment. The computer 120 may be a conventional computer, a distributed computer, or any other type of computer; the invention is not so limited.

In other embodiments other configurations are used in PC 120. System bus 123 may be any of several types, including a memory bus or memory controller, a peripheral bus, and a local bus, and may use any of a variety of bus architectures. The system memory 122 may also be referred to as simply the memory, and it includes read-only memory (ROM) 124 and random-access memory (RAM) 125. A basic input/output system (BIOS) 126, stored in ROM 124, contains the basic routines that transfer information between components of personal computer 120. BIOS 126 also contains start-up routines for the system.

Personal computer 120 further includes hard disk drive 127 having one or more magnetic hard disks (not shown) onto which data is stored and retrieved for reading from and writing to hard-disk-drive interface 132, magnetic disk drive 128 for reading from and writing to a removable magnetic disk 129, and optical disk drive 130 for reading from and/or writing to a removable optical disk 131 such as a CD-ROM, DVD or other optical medium. Hard disk drive 127, magnetic disk drive 128, and optical disk drive 130 are connected to system bus 123 by a hard-disk drive interface 132, a magnetic-disk drive interface 133, and an optical-drive interface 134, respectively. The drives 127, 128, and 130 and their associated computer-readable media 129, 131 provide nonvolatile storage of computer-readable instructions, data structures, program modules and other data for personal computer-120. Although the exemplary environment described herein employs a hard disk, a removable magnetic disk 129 and a removable optical disk 131, those skilled in the art will appreciate that other types of computer-readable media which can store data accessible by a computer may also be used in the exemplary operating environment. Such media may include magnetic tape cassettes, flash-memory cards, digital video disks (DVD), Bernoulli cartridges, RAMs, ROMs, and the like.

In various embodiments, program modules are stored on the hard disk drive 127, magnetic disk 129, optical disk 131, ROM 124 and/or RAM 125 and may be moved among these devices, e.g., from hard disk drive 127 to RAM 125. Program modules include operating system 135, one or more application programs 136, other program modules 137, and/or program data 138. A user may enter commands and information into personal computer 120 through input devices such as a keyboard 140 and a pointing device 142. Other input devices (not shown) for various embodiments include one or more devices selected from a microphone, joystick, game pad, satellite dish, scanner, or the like. These and other input devices are often connected to the processing unit 121 through a serial-port interface 146 coupled to system bus 123, but in other embodiments they are connected through other interfaces not shown in FIG. 1, such as a parallel port, a game port, or a universal serial bus (USB) interface. A monitor 147 or other display device also connects to system bus 123 via an interface such as a video adapter 148. In some embodiments, one or more speakers 157 or other audio output transducers are driven by sound adapter 156 connected to system bus 123. In some embodiments, in addition to the monitor 147, system 80 includes other peripheral output devices (not shown) such as a printer or the like.

In some embodiments, personal computer 120 operates in a networked environment using logical connections to one or more remote computers such as remote computer 149. Remote computer 149 may be another personal computer, a server, a router, a network PC, a peer device, or other common network node. Remote computer 149 typically includes many or all of the components described above in connection with personal computer 120; however, only a storage device 150 is illustrated in FIG. 1. The logical connections depicted in FIG. 1 include local-area network (LAN) 151 and a wide-area network (WAN) 152, both of which are shown connecting PC 120 to remote computer 149; typical embodiments would only include one or the other. Such networking environments are commonplace in offices, enterprise-wide computer networks, Intranets and the Internet.

When placed in a LAN networking environment, PC 120 connects to local network 151 through a network interface or adapter 153. When used in a WAN networking environment such as the Internet, PC 120 typically includes modem 154 or other means for establishing communications over network 152. Modem 154 may be internal or external to PC 120 and connects to system bus 123 via serial-port interface 146 in the embodiment shown. In a networked environment, program modules depicted as residing within PC 120 or portions thereof may be stored in remote-storage device 150. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

Example Embodiments

In approaches that model the temporal affinity of members of a structure using weights, it is not clear how these weights formally relate to minimizing the number of cache misses. Accordingly, the present invention instead models the behavior of an application's access to members of structures more directly. Specifically, in one example embodiment of the present invention, a Markov-type model known as a member transition graph (MTG) is used to model the application's access to a particular structure and its constituent members, as well as how the ordering of the structure's members affects the number of cache misses. The MTG of a structure is a Markov model, augmented to account for cache behavior. Using the MTG, the cache miss rate for a hypothetical ordering of members of a structure is precisely defined by solving a system of linear equations. By minimizing the cache miss rate, an ordering that yields improved cache performance can be determined.

The MTG model is informed by trace data collected while the application is running. This trace data includes information regarding the memory addresses accessed by the application and any structure members corresponding to these memory addresses. Once the trace data is gathered, it is used in deriving the parameters of the MTG model. The MTG model is then applied to the structure members to find advantageous reorderings of the structure members.

Figure 2:
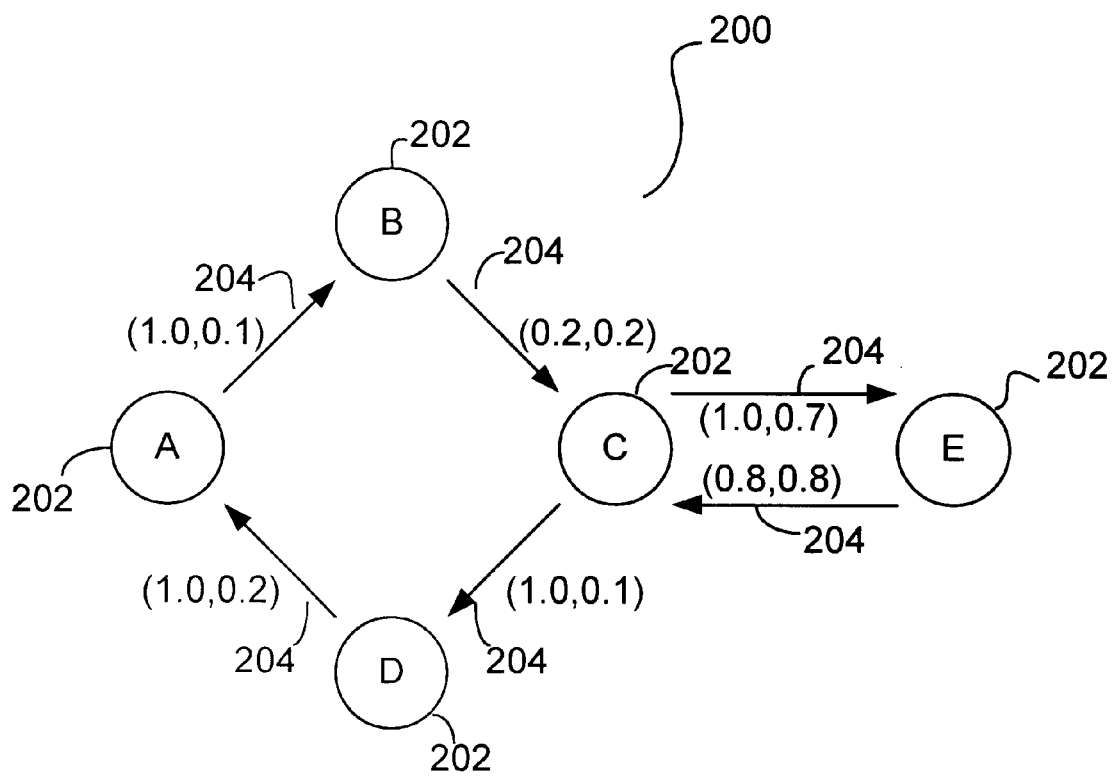
FIG. 2 conceptually illustrates an example cache behavior model, according to a particular embodiment of the present invention.

Referring again to the drawings, FIG. 2 depicts an example MTG 200, according to one embodiment of the present invention. The MTG 200 has a number of nodes 202 that represent members of the structure to be reorganized. The nodes 202 are connected by edges 204 that are associated with a pair of probabilities ($p_{ij}$, $q_{ij}$). For any pair of members i and j, the transition probability $p_{ij}$ is the probability that i was the member accessed immediately before j. The cache line survival probability $q_{ij}$ is the probability that any line in the cache when i is accessed remains in the cache when j is accessed. These two values are independent of the ordering. In the example MTG 200 of FIG. 2, the edge 204 between the nodes 202 representing members A and B is associated with the pair of probabilities (1.0, 0.1). Because the transition probability $p_{AB}$ is 1.0, member A is always accessed immediately before member B. It should be noted that it is not necessarily implied that member B is always accessed immediately after member A. While member A is always accessed immediately before member B, however, the cache line survival probability $q_{AB}$ of 0.1 indicates that a line survives in the cache between accesses to members A and B only 10% of the time.

The MTG 200 essentially represents an augmented Markov model. Thus, it assumes that the probability that a particular member will be accessed immediately after another member depends only on which member was accessed last. While most programs do not strictly satisfy this assumption, the model still approximates cache behavior well for many programs because probabilities are measured by frequency counting from actual trace data. Also, the model provides a principled basis for reordering algorithms that improve cache performance.

Using the model represented by the MTG 200, the expected cache performance associated with any reordering of the members of a structure can be predicted. First, the probability of a cache hit is expressed as a conditional sum over the member that is being accessed. That is, the probability of a cache hit is the sum over all members of the structure of the probabilities that a cache hit will occur, given that a particular member is being accessed, multiplied by the probability $p_i$ of accessing the particular member i in question:

$$Pr(hit) = \sum_i Pr(hit \mid access\_i) \cdot Pr(access\_i) \quad (1)$$

The probability $p_i$ of accessing a particular member i can be computed readily from the $p_{ij}$'s using a system of equations:

$$p_i = \sum_j p_{ji} \cdot p_j,$$

$$1 = \sum_i p_i$$

Alternatively, the probabilities $p_i$ can also be computed easily using frequency counts in the trace data rather than the above system of equations.

The probability that a cache hit will occur given that a particular member i is being accessed is determined by solving a system of linear equations. If L is a collection of members on one cache line, i∈L denotes that member i is on cache line L. $X_i^L$ denotes the probability that cache line L is in the cache when member i is accessed. The probabilities $X_i^L$ can then be determined by solving the following system of equations:

$$X_i^L = \sum_{j \in L} p_{ji} q_{ji} + \sum_{j \notin L} p_{ji} q_{ji} X_j^L, \quad \text{if } i \in L \quad (2)$$

$$X_i^L = \sum_j p_{ji} q_{ji} X_j^L, \quad \text{if } i \notin L \quad (3)$$

Equation 2 above considers the case in which member i is on cache line L. In this equation, the index j denotes the previous member accessed. If member j is also on cache line L, then the probability that the cache line on which member i resides—cache line L—is still in the cache when member i is accessed is simply $q_{ji}$. If, on the other hand, member j is not on cache line L, then line L can only be in the cache when i is accessed if (1) it was in the cache when j was accessed and (2) it survived the transition from accessing member j to accessing member i. These two events occur with probabilities $X_j^L$ and $q_{ji}$, respectively.

Equation 3 applies when member i is not on cache line L. In this case, the determination of the probability that L is in the cache when member i is accessed simplifies because it depends only on which member j was previously accessed, whether line L was in the cache when member j was accessed, and whether line L survived the transition from accessing member j to accessing member i. These events occur with probabilities $X_j^L$ and $q_{ji}$, respectively. The system of equations represented in equations 2 and 3 consists of mn equations, where n is the number of members in the structure and m is the number of cache lines spanned by the structure.

If L(i) denotes the cache line that contains the member i, then for each member i, the value $X_i^{L(i)}$ is the probability of a cache hit, given that member i is accessed. Accordingly, the probability of a cache hit can be expressed simply as:

$$Pr(hit) = \sum_i p_i X_i^{L(i)} \quad (4)$$

It is readily appreciated that the goal of finding the ordering that minimizes cache misses is equivalent to finding the assignment of members to cache lines that maximizes the sum in equation 4 subject to capacity constraints for the cache lines and alignment constraints for the members. It is to be appreciated by those of skill in the art that this problem is NP-hard. As described below, however, various embodiments of the present invention can be used to determine an approximate solution to this problem.

Care should be taken to choose the number of cache lines m large enough to include the optimal placement of members. Otherwise, a solution may be reached that does not represent an optimal placement. For example, the members of a structure may all fit on two cache lines, but the optimal placement may involve spreading the members across three cache lines.

It can be appreciated that using the MTG 200 to determine an optimal structure ordering potentially yields more efficient orderings than those obtained using field affinity graph or temporal relationship graph models. In both of these types of conventional approaches, weighted graphs are formed to model the temporal affinity between members, and clustering is performed to find an efficient ordering. There is no guarantee, however, of an optimal solution. By contrast, according to various implementations of the present invention, accesses to members of structures are directly modeled statistically. This statistical model is used to construct an optimization problem using the solutions to a set of linear equations. An optimal solution is obtainable as one that minimizes the miss rate, or maximizes the hit rate, as described in equation (4) above.

Figure 3:
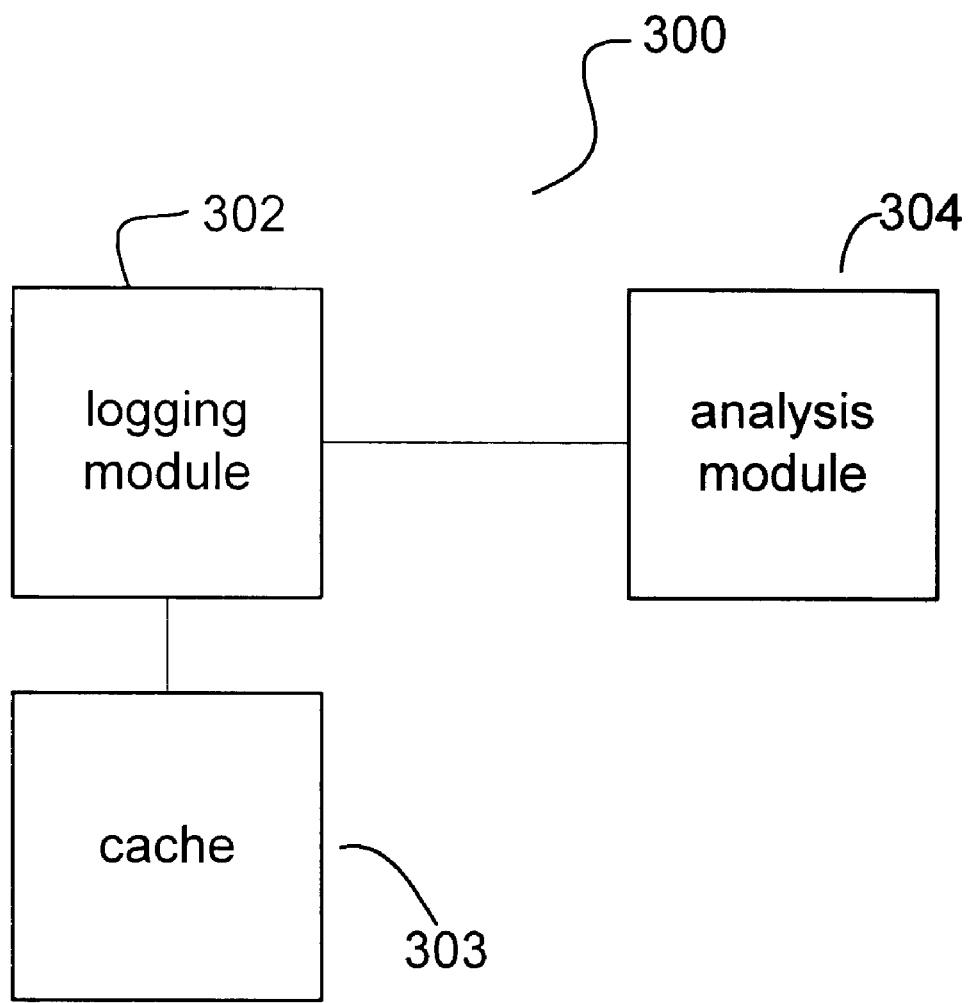
FIG. 3 depicts an example system for characterizing cache behavior, according to another embodiment of the present invention.

As mentioned above, the model is informed by trace data collected while the application is running. In particular, in the equations above, the values for $p_{ij}$ and $q_{ij}$ for each pair of members i and j are determined from trace data. FIG. 3 depicts an example profile module 300 for collecting this trace data. A logging module 302 records memory access information while the application is running, while affecting the operation of the application itself to only a slight degree. This memory access information includes addresses corresponding to locations within a cache 303 that are accessed during execution of the application. Address calculation operations are also tracked so as to handle properly aliasing situations that may arise when address calculations are performed within a program. The logging module 302 maintains and references compiler tables to identify which members of which structures are accessed in the memory access stream.

Figure 4:
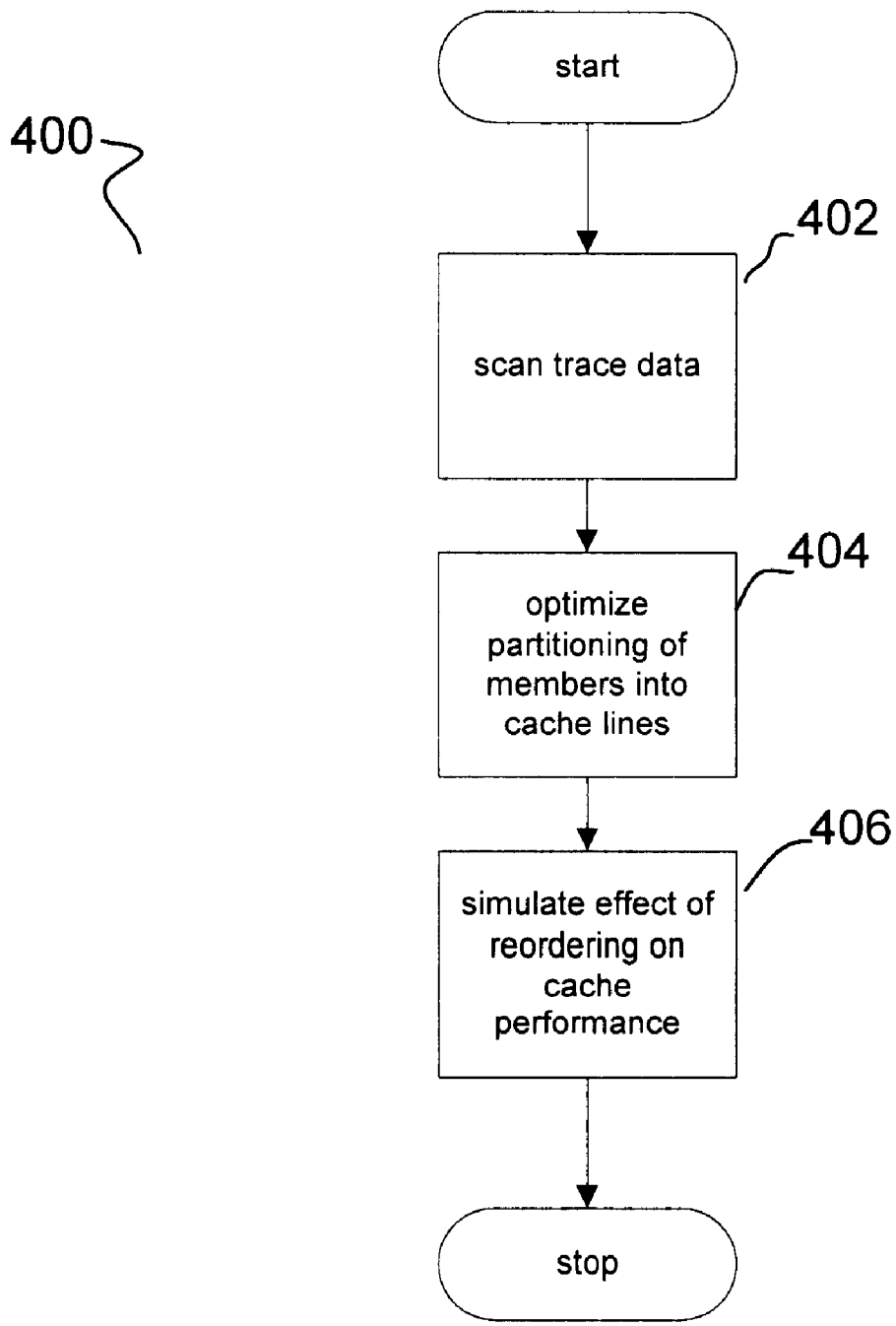
FIG. 4 is a flowchart depicting an example process for characterizing cache behavior, according to still another embodiment of the present invention.

The trace data collected by the logging module 302 is then evaluated by an analysis module 304 to find the optimal reordering of members for each structure according to the model described above in connection with FIG. 2. An example process 400 for evaluating the trace data is depicted in FIG. 4. First, at a block 402, the analysis module 304 scans the trace data and computes the values of $p_{ij}$ and $q_{ij}$ for each pair of members i and j. The values of $p_{ij}$ and $q_{ij}$ are stored in a transition probability matrix $p_{ij}$ and a cache survival probability matrix $q_{ij}$, respectively. Because many of the instructions in a program involve memory accesses, the logging module 302 can produce large amounts, e.g., several gigabytes, of trace data from only a few minutes of program execution. Scanning through the trace data consumes considerable computational resources, as each memory access might require the fetching of type information, the determination of which member of the structure instance was accessed immediately before the instant member, and the updating of statistical information. As a result, it is not unusual for scanning to require over an hour to complete for trace data that is several gigabytes in length.

To compute the values of $p_{ij}$, the transition probability, for each pair of members i and j, the analysis module 304 counts how many times each transition between a given pair of members i and j occurs. If $C_{ij}$ denotes the number of times an access to member j is immediately preceded by an access to member i, then $p_{ij}$ is simply $C_{ij}/\Sigma_k C_{kj}$, that is, $C_{ij}$ divided by the total number of transitions between accessing one member and accessing another member. To determine $q_{ij}$, the cache line survival probability, the analysis module 304 simulates the memory accesses in the trace on a typical cache while it scans the trace data. When member j is accessed, the analysis module 304 determines whether the line on which member i resides, which was brought into the cache when member i was accessed, is still in the cache. The cache line survival probability $q_{ij}$ is then the number of times that the line on which member i resides is still in the cache divided by the total number of times the transition between accessing the particular members i and j occurred. While the computed values of $q_{ij}$ are dependent on the cache parameters used, in most cases, changing the cache parameters only modifies the computed $q_{ij}$ values by a scale factor and does not affect the determination of which ordering is optimal.

After the analysis module 304 computes the values of $p_{ij}$ and $q_{ij}$, execution proceeds to a block 404 of FIG. 4, at which the analysis module 304 determines, for each structure, how to partition the members into cache lines so as to optimize the cache hit rate as expressed in equation (4) above. Any of at least three methods can be used to search through potential orderings to find an optimal solution. One of these methods is known as a branch and bound algorithm and considers all possible solutions. Because the time involved in determining the optimal solution using this method increases exponentially with the number of members, this method is only practical for use with structures having relatively few members.

For larger structures, i.e., those having more members, it is more practical to use a local search algorithm, which iteratively improves an initial approximation to the optimal solution. First, for each pair of members, the members are removed from their respective lines. Placement of these members on every other line is then considered on a pair-by-pair basis. This process continues iteratively until the results are satisfactory. In the worst case scenario, the number of orderings considered during each iteration is $Om^2n^2$, where n is the number of members, m is the number of cache lines used, and O is a constant whose value is independent of both m and n. It should be noted that the final ordering is guaranteed to be no worse than the initial ordering, regardless of the number of iterations. Thus, while the algorithm can be executed several times to refine the ordering of members within structures, it sometimes suffices to execute the algorithm only a few times.

It is known in the art that certain advantages might accrue from reordering structures dynamically depending on the data that is being supplied to the program. In the dynamic context, the probabilities needed for the model change over time. According to another embodiment of the present invention, the various implementations described herein are used to perform dynamic reordering. In particular, the local search method is believed to work especially well because it refines known solutions to obtain better ones. As the parameters of the model change over time, what was a good solution at one time might not produce good results at another time. Under these circumstances, the local search method will search for a better solution that is similar to the previous solution. Thus, the local search method adapts to changes in the model over time.

Still another method that can be used to determine how to partition members so as to optimize the cache hit rate involves a modified version of the Fiduccia-Mattheyses (FM) algorithm, which was originally developed for solving VLSI and circuit board layout problems. The FM algorithm is a graph partitioning algorithm whose input is a graph with edge and node weights. The input graph is partitioned into two components so that the sum of the node weights in each component is bounded by a predetermined amount, e.g., the cache line length, and the sum of the edge weights between the components is small. The process is optionally repeated recursively to partition the input graph into a larger number of components. In the context of partitioning members of structures into cache lines, the objective is to place elements into cache lines so that the sum of costs of elements on different cache lines is minimized.

To this end, a modified FM algorithm is used to reduce the overall problem into a number of smaller problems, each of which can be solved separately. In this context, the nodes of the input graph represent members of a structure, and the weight of a node is the length of the corresponding member. The weight of an edge between a pair of members i and j is the cost associated with the elements of the pair being on different cache lines as described by a cost function c[i,j]. The cost function is symmetric, such that c[i,j]=c[j,i] for all members i and j.

One way in which the modified FM algorithm used in this context differs from the standard FM algorithm is that the standard FM algorithm has a stringent requirement as to how much weight each component should have. By contrast, the modified FM algorithm allows for more freedom because an entire cache line will be on one side of the partition. In this algorithm, the weight of an element is its length. The standard FM algorithm defines a balanced partition as one in which the weight of each side is less than or equal to the sum of (1) half of the total weight of all nodes and (2) the maximum weight of a single node, considering all nodes. To provide for greater flexibility, the modified FM algorithm instead defines a balanced partition as one in which the weight of each side is less than or equal to the sum of (1) half of the sum of lengths of all nodes and (2) the cache line length.

The FM algorithm is modified in certain aspects to facilitate its use in the context of partitioning members into cache lines. For example, the data structures in the FM algorithm are of the dense type. Because the cost between structure elements is often zero, it is more advantageous to use sparse type data structures in the modified FM algorithm. For instance, an indexed array of elements is used, and the costs associated with elements are inserted in a linked list. Accordingly, an array of costs need not be maintained.

Figure 5:
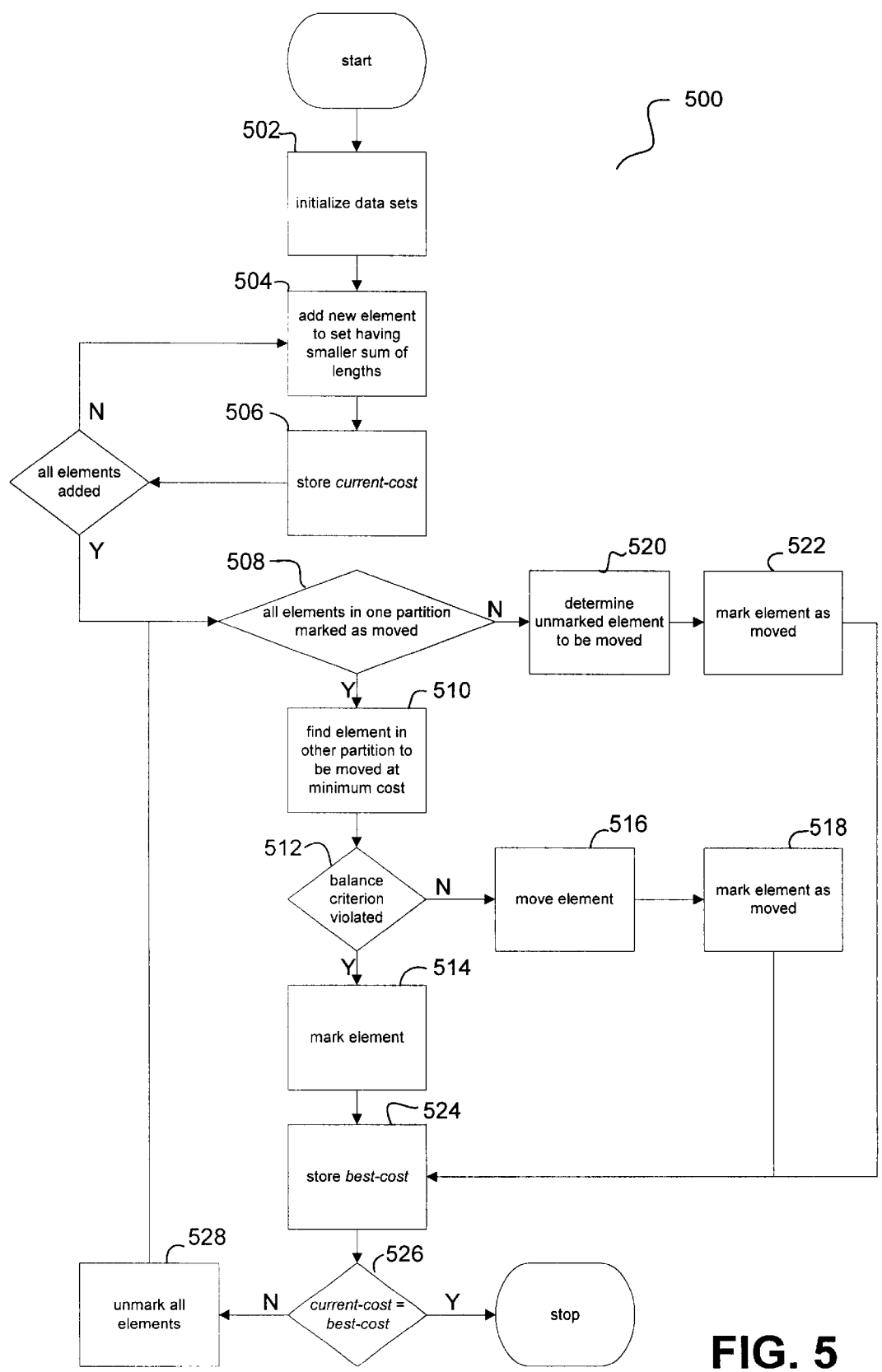
FIG. 5 is a flowchart illustrating an example method for use in improving cache performance, according to yet another embodiment of the present invention.

FIG. 5 is a flowchart illustrating an example implementation of a modified FM algorithm 500. To create an initial partition A, B that satisfies the balance criterion, that is, that the weight of each side is less than or equal to the sum of (1) half of the sum of lengths of all nodes and (2) the cache line length, two data sets are initialized, as depicted at a block 502. These data sets are initially empty. At a block 504, a new element is added to the set that currently has the smaller sum of lengths of members. Next, at a block 506, the cost associated with this element is determined and stored in a variable, e.g., current-cost. This process is repeated until all of the elements have been distributed among the initial partition A, B.

Next, the partitions are determined using an iterative process, where each iteration produces a partition. Each iteration uses the modified FM algorithm, which is itself another iteration whose length is determined by the number of elements. Initially, all of the elements are unmarked and are eligible to be moved between partitions. During each iteration, the analysis module 304 of FIG. 3 determines which unmarked element can be moved from partition A to partition B, or vice versa, at minimum cost without violating the balance criterion. If any unmarked elements exist in either partition A or partition B, such an element must exist if no element exists whose length is greater than the cache line length. Members that span multiple cache lines do have lengths greater than the cache line length and must be ignored when performing the modified FM algorithm.

If all of the elements in one partition, e.g., partition A, are marked as moved, as determined at a decision block 508, execution proceeds to a block 510, at which the other partition, e.g., partition B, is examined to determine which element can be moved at minimum cost. At a decision block 512, it is determined whether moving the element would violate the balance criterion. If so, the element is marked at a block 514 to avoid moving it in the future. If not, however, the element is moved, as depicted at a block 516, and marked as moved, as shown at a block 518.

On the other hand, if both partitions A and B have unmarked elements, the analysis module 304 simply determines which unmarked element can be moved at minimum cost without violating the balance criterion, as depicted at a block 520. At a block 522, the selected element is marked as moved so that it is not moved again in the future.

During the iteration, the analysis module 304 monitors which partition has the lowest cost associated with it and stores the associated cost in a variable, e.g., best-cost, as shown at a block 524. It should be noted that the cost associated with a partition can increase during the process. After the modified FM algorithm has been executed, the analysis module 304 determines whether current-cost=best-cost, as depicted at a decision block 526. If so, the process stops, as a solution has been found. If not, however, all of the elements are unmarked and rendered eligible to be moved, as shown at a block 528, and execution returns to the decision block 508. Another iteration thus begins in order to determine a new partition. The process repeats until current-cost=best-cost.

The cost associated with a partition is related to its cache miss rate. Thus, for each ordering generated by the search algorithm, a system of linear equations is solved to determine its cache miss rate. The matrices of equations that are solved are sometimes sparse, but sometimes dense. Because different methods of solving the matrices of equations will produce results with varying degrees of efficiency, it is advantageous to select an efficient method. In a particular embodiment of the present invention, a conventional successive over-relaxation (SOR) approach is initially used to solve the system of equations. Before performing each iteration, however, it is determined whether switching to a conventional Gaussian elimination (GE) method would be more efficient. To do this, the number of multiplication operations made in the SOR method and the number of multiplication operations that would be involved in the GE method are estimated and compared. If, during any iteration of the SOR method, it is estimated that the GE method would involve fewer multiplication operations, the GE method is used to solve the system of equations.

In evaluating the cost associated with a particular ordering, it is observed that, in certain situations, optimal performance may be achieved by allowing members to span multiple cache lines. Each cache line can be considered a "bin" in which members are placed. In the optimization algorithm, the ordering of members within each bin, or cache line, is not determined. It only matters that some way exists to pack the members in a bin so that they fit in between the adjacent overlapping members, i.e., members that are not fully contained in any single cache line. In order to write a system of equations, each overlapping member is considered to reside on both of the adjacent cache lines.

When no overlapping members exist, the problem simplifies in two aspects. First, the order of the bins or cache lines does not matter. By contrast, when overlapping members do exist, the ordering of adjacent bins does matter because it affects the amount of space available in each bin. As a result, the search space to be considered by the branch and bound algorithm is significantly increased.

Another aspect in which the problem simplifies in the absence of overlapping members is that it is easier to determine whether a given collection of members can fit in a single cache line. To make this determination, the sizes of the members are added, and their sum is compared with the cache line size. If the sum is no larger than the cache line size, it can be said with certainty that the collection of members will fit in the cache line.

When overlapping members exist, this determination is more difficult to make. In fact, the problem is NP-hard. Even with overlapping members, however, it is possible to determine whether members will fit in a single cache line in a reasonably efficient manner. First, as a preliminary measure, it can be determined quickly whether the members will either easily fit in the cache line or, on the other hand, whether the members will certainly not fit in the cache line. If neither of these preliminary determinations can be made, a more extensive inquiry is performed.

As mentioned above, for the general case in which a member is overlapping on each side of a cache line, the problem of determining whether the members will fit in the cache line is NP-hard. To solve the problem relatively quickly, a pseudo-polynomial time algorithm is used. In particular, this algorithm solves the problem in $O(Ln)$ time, where L is the cache line size.

In practice, all alignment constraints are powers of two, and all sizes are multiples of the alignment. These considerations significantly simplify the problem of finding a packing of the members in which all of the members are aligned. If there are no overlapping members, then $L=2^k$ space is available to pack the members, for some value of k. In this scenario, the members are packed in decreasing order by their alignment constraints. The members can be conceived as being packed from the "left" side, i.e., the beginning, of the cache line. If the sum of the lengths of the members is less than the cache line length, there will be some unused space at the end of the cache line. All members will be aligned because of the special form of their alignments and sizes, namely, powers of two and multiples of the alignment, respectively. Consequently, each cache line can be considered a bin in the case of no overlapping members.

If a member is overlapping on the left side of the cache line, members are instead packed from the "right" side of the cache line, i.e., the end of the cache line. Similarly, there is a member overlapping on the "right" side of the cache line, members are packed from the left side of the cache line. Neither of these situations is particularly problematic.

If, on the other hand, members are overlapping on both the left and right sides of the cache line, a location in the middle of the cache line is found from which members can be packed from the right and the left. It can be shown that, if the members can be packed in some manner, then they can be packed from the left and the right.

A dynamic programming algorithm is used to find the packing scheme in the case in which members overlap on both sides of the cache line. According to this algorithm, every possible packing arrangement in which members are packed from both the left and the right sides around a location in the middle of a cache line is computed. Of these arrangements, the dynamic programming algorithm keeps track of which ones fit the available space in the cache line. Members are processed in decreasing order by alignment. Meanwhile, an array A[0 . . . L−1] is maintained, where A[i]=1 if there is some way to pack all of the members processed thus far starting at position i and A[i]=0 if not.

On each iteration of the dynamic programming algorithm, the array A is updated. Another array A' is defined as the new value of A during the instant iteration. First, A'[i] is initialized with zero values for all values of i. Next, for each value of i, if A[i]=1, then the value of A[i−s] is set to one, where s is the size of the current member, provided that i−s is past the end of the member overlapping on the left. In addition, the value of A[i+S+s] is also set to one, where S is the size of all of the members processed in previous iterations, provided that i+S+s is before the member overlapping on the right. After this process is iterated for all values of i, the array A is examined to determine whether A[i]=1 for any value of i. If so, then the members can be packed into the cache line.

The standard Fiduccia-Mattheyses algorithm uses a specialized data structure to track the cost of moving an element from one side of the partition to the other. This specialized data structure does not allow the degree of flexibility that is desirable for partitioning members into cache lines. Thus, the algorithm used in the present invention uses a more general data structure that allows certain operations such as insertion, delete-minimum, increase, and decrease. In one particular embodiment, binary heaps are used to organize the unmarked elements according to the cost of moving the elements. Using binary heaps obviates the need to quantize costs associated with moving the elements. When an element is moved, the analysis module 304 updates the cost of moving the elements adjacent to the moved element. Accordingly, the analysis module 304 should have the ability to interact with the binary heaps to update these costs.

Referring again to FIG. 4, after determining how to partition the members into cache lines, the analysis module 304 simulates the effect of the reordering, as depicted at a block 406. To do this, the analysis module 304 makes a second pass over the trace data collected in connection with block 402 and simulates in the cache the memory references that would occur using the proposed reorderings. The analysis module 304 is configured to model any of a variety of conventional types of caches. In most cases, the analysis module 304 simulates a small direct-mapped cache so as to reduce the amount of time involved in simulating the cache. The cache miss rate of each structure is recorded and may be displayed subsequently for the user's benefit. These cache miss rates can be compared with the miss rates from the original orderings, which may be displayed in connection with block 402. Decreases in the cache miss rates of each structure can often be observed.

To compute the cache miss rates using a proposed reordering, certain address calculations are performed. Specifically, for each access, the address of the member accessed is translated to an address in the proposed reordering using an offset determined in connection with generating the proposed reordering. An access is then simulated at the translated address, and the cache miss counts are updated for each structure.

The operation of this embodiment of the present invention can be appreciated through consideration of a simple operational example. For purposes of this example, it assumed that a structure S is defined as follows:

```
struct S
{
        int a, b, c, d, e, f;
};
```

It is further assumed that the accesses to the structure S are performed as follows:

```
S A[N];
for (int i = 0; i < N; i++)
        A[i].a = A[i].b = 0;
for (int i = 0; i < N; i++)
        A[i].c = A[i].d = i;
for (int i = N-1; i >=0; i--)
        A[i].e = A[i].f = i;
```

After collecting the trace data, the following transition probability matrix of transition probabilities $p_{ij}$ is produced:

|   | a | b | c | d | e | f |
|---|---|---|---|---|---|---|
| a | 0 | 1 | 0 | 0 | 0 | 0 |
| b | 0 | 0 | 1 | 0 | 0 | 0 |
| c | 0 | 0 | 0 | 1 | 0 | 0 |
| d | 0 | 0 | 0 | 0 | 1 | 0 |
| e | 0 | 0 | 0 | 0 | 0 | 1 |
| f | 0 | 0 | 0 | 0 | 0 | 0 |

This matrix shows that there is exactly one path that is taken through the members of the structure S. For example, whenever member S.a is accessed, member S.b is always the next member accessed because $p_{ab}=1$. Similarly, whenever member S.f is accessed, it is always the last member accessed in the structure. With such certain information, the analysis module can be expected to optimize the ordering of the members perfectly.

A cache line survival matrix of cache line survival probabilities $q_{ij}$ is also generated by the analysis module after collecting the trace data. In this example, the cache line survival matrix is as follows:

|   | a | b | c | d | e | f |
|---|---|---|---|---|---|---|
| a | 0 | 1 | 0 | 0 | 0 | 0 |
| b | 0 | 0 | 0 | 0 | 0 | 0 |
| c | 0 | 0 | 0 | 1 | 0 | 0 |
| d | 0 | 0 | 0 | 0 | 0 | 0 |
| e | 0 | 0 | 0 | 0 | 0 | 1 |
| f | 0 | 0 | 0 | 0 | 0 | 0 |

It is assumed that N is very large, such that by the time A[i] is reached in the second loop, it has been flushed out of the cache by the other accesses that occurred since it was accessed in the first loop. Because members a and b, c and d, and e and f are always accessed immediately after one another, the cache line always survives those transitions, as indicated in the preceding table.

In this operational example, it is further assumed that three of these members can fit on each cache line. The original ordering thus has members a, b, and c residing on one cache line and members d, e, and f on another cache line.

With this ordering, it is readily apparent that the cache hit rate of this ordering will be 2/6, or 1/3, because only the accesses to members b and f will result in cache hits.

When the analysis module evaluates various possible partitionings of members among cache lines, it is determined that the optimal cache hit rate is obtained by placing members a and b on one cache line, members c and d on another, and members e and f on still another. This ordering produces a cache hit rate of 1/2 because accesses to members b, d, and f will result in cache hits. Examination of the cache line survival matrix reveals that accesses to members a, c, and e cannot result in cache hits, as the cache line survival probabilities in the columns corresponding to these members are all zero. Thus, it is readily seen that this ordering is indeed optimal in this particular example. To implement this ordering, the declaration of the structure S is rewritten as follows:

```
struct S
{
    int a, b, dummy1;
    int c, d, dummy2;
    int e, f, dummy3;
};
```

It is interesting to note that, in this particular operational example, the optimal ordering uses three cache lines, while the original ordering used only two. Thus, in this and in certain other situations, the most compact partitioning of members into cache lines is not necessarily the optimal ordering.

In another embodiment of the present invention, the MTG 200 is used in a multiprocessor environment, in which two or more processors can share a single cache line. When one processor writes to a cache line, however, the copies of the cache lines associated with the other processor must be invalidated in the interest of consistency.

As demonstrated above, access behavior with respect to members of structures is modeled using an augmented Markov model. The problem of finding a structure ordering that minimizes cache misses according to the model is equivalent to maximizing a sum that depends on the solution to a set of linear equations. This model is applied to improve the cache performance of programs by using trace data to supply the parameters of the model.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms, such as a computer program encoded in a machine-readable medium, such as a CD-ROM, magnetic medium, ROM or RAM, or in an electronic signal. Further, as used in the claims herein, the term "module" shall mean any hardware or software component, or any combination thereof

What is claimed is:

1. A computer-implemented method for characterizing cache access behavior of an application, the method comprising:

executing the application;

collecting memory access information relating to a plurality of memory locations accessed within a cache memory while the application is being executed and to a plurality of data objects corresponding to the memory locations; and determining at least one transition probability and at least one survival probability as a function of the collected memory access information.

2. The method of claim 1, wherein the memory access information comprises information relating to at least one address calculation operation.

3. The method of claim 1, further comprising referencing a compiler table to associate the plurality of memory locations accessed within the cache memory with the plurality of data objects.

4. The method of claim 1, wherein the data objects comprise a plurality of members of a structure.

5. The method of claim 1, further comprising determining a cache hit rate as a function of the at least one transition probability and the at least one survival probability.

6. The method of claim 1, further comprising determining a cache hit rate as a function of the memory access information.

7. The method of claim 6, further comprising determining the cache hit rate at least in part by solving a system of linear equations.

8. The method of claim 1, further comprising constructing a member transition model as a function of the at least one transition probability and the at least one survival probability, the member transition model having a plurality of nodes connected by a plurality of edges, each node representing a distinct member of a structure.

9. The method of claim 8, further comprising using the member transition model to determine a cache hit rate corresponding to an ordering of the data objects.

10. The method of claim 8, further comprising using the member transition model to determine an optimal ordering of the data objects from a plurality of possible orderings of the data objects.

11. A computer-implemented method for selecting an ordering of a plurality of members of a data structure residing on a plurality of cache lines in a cache, the method comprising:

executing an application;

collecting trace data comprising a plurality of addresses corresponding to a plurality of locations accessed within the cache during execution of the application;

associating the plurality of collected addresses with the plurality of members of the data structure;

determining a plurality of transition probabilities and a plurality of cache line survival probabilities at least in part as a function of the plurality of collected addresses;

constructing a member transition model as a function of the plurality of transition probabilities and the plurality of cache line survival probabilities, the member transition model having a plurality of nodes connected by a plurality of edges, each node representing a distinct member of the data structure; and using the member transition model to select an ordering of the members from a plurality of possible orderings of the members.

12. The method of claim 11, further comprising determining a transition probability for first and second members of the data structure by:

counting, as a first quantity, a number of accesses to the first member of the data structure that are immediately followed by an access to the second member of the data structure;

counting, as a second quantity, a total number of accesses to any member of the data structure that are immediately followed by an access to any other member of the data structure; and dividing the first quantity by the second quantity to obtain the transition probability.

13. The method of claim 11, further comprising determining a cache line survival probability for first and second members of the data structure by:

scanning the trace data;

while scanning the trace data, simulating a plurality of memory accesses in the cache;

counting, as a first quantity, a number of occurrences during the simulation in which a cache line on which the first member resides is in the cache when the second member is accessed immediately after the first member;

counting, as a second quantity, a number of occurrences during the simulation in which the second member is accessed immediately after the first member; and dividing the first quantity by the second quantity to obtain the cache line survival probability.

14. The method of claim 11, further comprising referencing a compiler table to associate the plurality of collected addresses with the plurality of members of the data structure.

15. The method of claim 11, further comprising determining a cache hit rate as a function of the plurality of transition probabilities and the plurality of cache line survival probabilities.

16. The method of claim 11, further comprising determining a cache hit rate at least in part as a function of the collected addresses.

17. The method of claim 16, further comprising determining the cache hit rate at least in part by solving a system of linear equations.

18. The method of claim 11, further comprising:

storing the plurality of transition probabilities in a transition probability matrix; and storing the plurality of cache line survival probabilities in a cache line survival probability matrix.

19. The method of claim 11, further comprising using a search algorithm to evaluate the plurality of possible orderings of the data objects.

20. The method of claim 19, wherein the search algorithm is a branch and bound-type search algorithm.

21. The method of claim 19, wherein the search algorithm is an iterative local search algorithm.

22. The method of claim 21, wherein the search algorithm comprises, for each pair of a plurality of pairs of members of the data structure:

removing each member of the pair from the cache line on which it resides;

evaluating the effect of placing the members of the pair on an alternative pair cache lines; and iterating the search algorithm until a quality criterion is satisfied.

23. The method of claim 21, further comprising selecting the ordering of the members of the data structure dynamically during execution of the application.

24. The method of claim 19, wherein the search algorithm is a modified Fiduccia-Mattheyses algorithm that, determines a plurality of costs associated with a plurality of possible orderings of the members of the data structure.

25. The method of claim 24, further comprising storing the plurality of costs using a linked list.

26. The method of claim 24, further comprising storing the plurality of costs using a binary heap.

27. The method of claim 24, further comprising:

initializing two data sets to an empty state;

distributing the plurality of members among the two data sets to form an initial partition;

selecting a member to be moved from one data set to the other data set;

moving the selected member; and repeating selecting a member to be moved from one data set to the other data set and moving the selected member until a cost criterion is satisfied.

28. The method of claim 11, further comprising determining a cache hit rate associated with the selected ordering of the members.

29. The method of claim 28, further comprising determining a cache line survival probability for first and second members of the data structure using the selected ordering of the members by:

determining an offset factor associated with the selected ordering of the members;

scanning the trace data;

while scanning the trace data, simulating a plurality of memory accesses in the cache;

for each memory access, translating an address of the member accessed to an address in the selected ordering using the offset factor;

counting, as a first quantity, a number of occurrences during the simulation in which a cache line on which the first member resides is in the cache when the second member is accessed immediately after the first member;

counting, as a second quantity, a number of occurrences during the simulation in which the second member is accessed immediately after the first member; and dividing the first quantity by the second quantity to obtain the cache line survival probability.

30. A computer arrangement, comprising:

a data collection module, configured to, during execution of an application, collect memory access information relating to a plurality of memory locations accessed within a cache memory and to a plurality of data objects corresponding to the memory locations; and an analysis module, responsive to the data collection module and configured to determine at least one transition probability and at least one survival probability as a function of the collected memory access information.

31. The computer arrangement of claim 30, wherein the memory access information comprises information relating to at least one address calculation operation.

32. The computer arrangement of claim 30, wherein the data collection module is further configured to reference a compiler table to associate the plurality of memory locations accessed within the cache memory with the plurality of data objects.

33. The computer arrangement of claim 30, wherein the data objects comprise a plurality of members of a structure.

34. The computer arrangement of claim 30, wherein the analysis module is further configured to determine a cache hit rate as a function of the at least one transition probability and the at least one survival probability.

35. The computer arrangement of claim 30, wherein the analysis module is further configured to determine a cache hit rate as a function of the memory access information.

36. The computer arrangement of claim 35, wherein the analysis module is further configured to determine the cache hit rate at least in part by solving a system of linear equations.

37. The computer arrangement of claim 30, wherein the analysis module is further configured to construct a member transition model as a function of the at least one transition probability and the at least one survival probability, the member transition model having a plurality of nodes connected by a plurality of edges, each node representing a distinct member of a structure.

38. The computer arrangement of claim 37, wherein the analysis module is further configured to use the member transition model to determine a cache hit rate corresponding to an ordering of the data objects.

39. The computer arrangement of claim 37, wherein the analysis module is further configured to use the member transition model to determine an optimal ordering of the data objects from a plurality of possible orderings of the data objects.

40. A computer arrangement, comprising:
a cache comprising a plurality of cache lines;
a data collection module, configured to, during execution of an application, collect trace data comprising a plurality of addresses corresponding to a plurality of locations accessed within the cache, and further configured to associate the plurality of collected addresses with a plurality of members of a data structure residing on at least some of the plurality of cache lines; and
an analysis module, in communication with the data collection module and configured to determine a plurality of transition probabilities and a plurality of cache line survival probabilities at least in part as a function of the plurality of collected addresses,
the analysis module further configured to construct a member transition model as a function of the plurality of transition probabilities and the plurality of cache line survival probabilities, the member transition model having a plurality of nodes connected by a plurality of edges, each node representing a distinct member of the data structure,
the analysis module further configured to use the member transition model to select an ordering of the members from a plurality of possible orderings of the members.

41. The computer arrangement of claim 40, wherein the analysis module is further configured to determine a transition probability for first and second members of the data structure by:
counting, as a first quantity, a number of accesses to the first member of the data structure that are immediately followed by an access to the second member of the data structure;
counting, as a second quantity, a total number of accesses to any member of the data structure that are immediately followed by an access to any other member of the data structure; and
dividing the first quantity by the second quantity to obtain the transition probability.

42. The computer arrangement of claim 40, wherein the analysis module is further configured to determine a cache line survival probability for first and second members of the data structure by:
scanning the trace data;
while scanning the trace data, simulating a plurality of memory accesses in the cache;
counting, as a first quantity, a number of occurrences during the simulation in which a cache line on which the first member resides is in the cache when the second member is accessed immediately after the first member;
counting, as a second quantity, a number of occurrences during the simulation in which the second member is accessed immediately after the first member; and
dividing the first quantity by the second quantity to obtain the cache line survival probability.

43. The computer arrangement of claim 40, wherein the data collection module is further configured to reference a compiler table to associate the plurality of collected addresses with the plurality of members of the data structure.

44. The computer arrangement of claim 40, wherein the analysis module is further configured to determine a cache hit rate as a function of the plurality of transition probabilities and the plurality of cache line survival probabilities.

45. The computer arrangement of claim 40, wherein the analysis module is further configured to determine a cache hit rate at least in part as a function of the collected addresses.

46. The computer arrangement of claim 45, wherein the analysis module is further configured to determine the cache hit rate at least in part by solving a system of linear equations.

47. The computer arrangement of claim 40, wherein the analysis module is further configured to:
store the plurality of transition probabilities in a transition probability matrix; and
store the plurality of cache line survival probabilities in a cache line survival probability matrix.

48. The computer arrangement of claim 40, wherein the analysis module is further configured to use a search algorithm to evaluate the plurality of possible orderings of the data objects.

49. The computer arrangement of claim 48, wherein the search algorithm is a branch and bound-type search algorithm.

50. The computer arrangement of claim 48, wherein the search algorithm is an iterative local search algorithm.

51. The computer arrangement of claim 50, wherein the search algorithm comprises, for each pair of a plurality of pairs of members of the data structure:
removing each member of the pair from the cache line on which it resides;
evaluating the effect of placing the members of the pair on an alternative pair of cache lines; and
iterating the search algorithm until a quality criterion is satisfied.

52. The computer arrangement of claim 50, wherein the analysis module is further configured to select the ordering of the members of the data structure dynamically during execution of the application.

53. The computer arrangement of claim 48, wherein the search algorithm is a modified Fiduccia-Mattheyses algorithm that determines a plurality of costs associated with a plurality of possible orderings of the members of the data structure.

54. The computer arrangement of claim 53, wherein the analysis module is further configured to store the plurality of costs using a linked list.

55. The computer arrangement of claim 53, wherein the analysis module is further configured to store the plurality of costs using a binary heap.

56. The computer arrangement of claim 53, wherein the analysis module is further configured to:
initialize two data sets to an empty state;
distribute the plurality of members among the two data sets to form an initial partition;
select a member to be moved from one data set to the other data set;
move the selected member; and
repeat selecting a member to be moved from one data set to the other data set and moving the selected member until a cost criterion is satisfied.

57. The computer arrangement of claim 40, wherein the analysis module is further configured to determine a cache hit rate associated with the selected ordering of the members.

58. The computer arrangement of claim 57, wherein the analysis module is further configured to determine a cache line survival probability for first and second members of the data structure using the selected ordering of the members by:
   determining an offset factor associated with the selected ordering of the members;
   scanning the trace data;
   while scanning the trace data, simulating a plurality of memory accesses in the cache;
   for each memory access, translating an address of the member accessed to an address in the selected ordering using the offset factor;
   counting, as a first quantity, a number of occurrences during the simulation in which a cache line on which the first member resides is in the cache when the second member is accessed immediately after the first member;
   counting, as a second quantity, a number of occurrences during the simulation in which the second member is accessed immediately after the first member; and
   dividing the first quantity by the second quantity to obtain the cache line survival probability.

59. A computer-readable medium having computer-executable modules stored thereon, comprising:
   a data collection module, configured to, during execution of an application, collect memory access information relating to a plurality of memory locations accessed within a cache memory and to a plurality of data objects corresponding to the memory locations; and
   an analysis module, responsive to the data collection module and configured to determine at least one transition probability and at least one survival probability as a function of the collected memory access information.

60. The computer-readable medium of claim 59, wherein the memory access information comprises information relating to at least one address calculation operation.

61. The computer-readable medium of claim 59, wherein the data collection module is further configured to reference a compiler table to associate the plurality of memory locations accessed within the cache memory with the plurality of data objects.

62. The computer-readable medium of claim 59, wherein the data objects comprise a plurality of members of a structure.

63. The computer-readable medium of claim 59, wherein the analysis module is further configured to determine a cache hit rate as a function of the at least one transition probability and the at least one survival probability.

64. The computer-readable medium of claim 59, wherein the analysis module is further configured to determine a cache hit rate as a function of the memory access information.

65. The computer-readable medium of claim 64, wherein the analysis module is further configured to determine the cache hit rate at least in part by solving a system of linear equations.

66. The computer-readable medium of claim 59, wherein the analysis module is further configured to construct a member transition model as a function of the at least one transition probability and the at least one survival probability, the member transition model having a plurality of nodes connected by a plurality of edges, each node representing a distinct member of a structure.

67. The computer-readable medium of claim 66, wherein the analysis module is further configured to use the member transition model to determine a cache hit rate corresponding to an ordering of the data objects.

68. The computer-readable medium of claim 66, wherein the analysis module is further configured to use the member transition model to determine an optimal ordering of the data objects from a plurality of possible orderings of the data objects.

69. A computer-readable medium having computer-executable modules stored thereon, comprising:
   a data collection module, configured to, during execution of an application, collect trace data comprising a plurality of addresses corresponding to a plurality of locations accessed within a cache comprising a plurality of cache lines, and further configured to associate the plurality of collected addresses with a plurality of members of a data structure residing on at least some of the plurality of cache lines; and
   an analysis module, in communication with the data collection module and configured to determine a plurality of transition probabilities and a plurality of cache line survival probabilities at least in part as a function of the plurality of collected addresses,
   the analysis module further configured to construct a member transition model as a function of the plurality of transition probabilities and the plurality of cache line survival probabilities, the member transition model having a plurality of nodes connected by a plurality of edges, each node representing a distinct member of the data structure,
   the analysis module further configured to use the member transition model to select an ordering of the members from a plurality of possible orderings of the members.

70. The computer-readable medium of claim 69, wherein the analysis module is further configured to determine a transition probability for first and second members of the data structure by:
   counting, as a first quantity, a number of accesses to the first member of the data structure that are immediately followed by an access to the second member of the data structure;
   counting, as a second quantity, a total number of accesses to any member of the data structure that are immediately followed by an access to any other member of the data structure; and
   dividing the first quantity by the second quantity to obtain the transition probability.

71. The computer-readable medium of claim 69, wherein the analysis module is further configured to determine a cache line survival probability for first and second members of the data structure by:
   scanning the trace data;
   while scanning the trace data, simulating a plurality of memory accesses in the cache;
   counting, as a first quantity, a number of occurrences during the simulation in which a cache line on which the first member resides is in the cache when the second member is accessed immediately after the first member;
   counting, as a second quantity, a number of occurrences during the simulation in which the second member is accessed immediately after the first member; and
   dividing the first quantity by the second quantity to obtain the cache line survival probability.

72. The computer-readable medium of claim 69, wherein the data collection module is further configured to reference a compiler table to associate the plurality of collected addresses with the plurality of members of the data structure.

73. The computer-readable medium of claim 69, wherein the analysis module is further configured to determine a cache hit rate as a function of the plurality of transition probabilities and the plurality of cache line survival probabilities.

74. The computer-readable medium of claim 69, wherein the analysis module is further configured to determine a cache hit rate at least in part as a function of the collected addresses.

75. The computer-readable medium of claim 74, wherein the analysis module is further configured to determine the cache hit rate at least in part by solving a system of linear equations.

76. The computer-readable medium of claim 69, wherein the analysis module is further configured to:
store the plurality of transition probabilities in a transition probability matrix; and
store the plurality of cache line survival probabilities in a cache line survival probability matrix.

77. The computer-readable medium of claim 69, wherein the analysis module is further configured to use a search algorithm to evaluate the plurality of possible orderings of the data objects.

78. The computer-readable medium of claim 77, wherein the search algorithm is a branch and bound-type search algorithm.

79. The computer-readable medium of claim 77, wherein the search algorithm is an iterative local search algorithm.

80. The computer-readable medium of claim 79, wherein the search algorithm comprises, for each pair of a plurality of pairs of members of the data structure:
removing each member of the pair from the cache line on which it resides;
evaluating the effect of placing the members of the pair on an alternative pair cache lines; and
iterating the search algorithm until a quality criterion is satisfied.

81. The computer-readable medium of claim 79, wherein the analysis module is further configured to select the ordering of the members of the data structure dynamically during execution of the application.

82. The computer-readable medium of claim 77, wherein the search algorithm is a modified Fiduccia-Mattheyses algorithm that determines a plurality of costs associated with a plurality of possible orderings of the members of the data structure.

83. The computer-readable medium of claim 82, wherein the analysis module is further configured to store the plurality of costs using a linked list.

84. The computer-readable medium of claim 82, wherein the analysis module is further configured to store the plurality of costs using a binary heap.

85. The computer-readable medium of claim 82, wherein the analysis module is further configured to:
initialize two data sets to an empty state;
distribute the plurality of members among the two data sets to form an initial partition;
select a member to be moved from one data set to the other data set;
move the selected member; and
repeat selecting a member to be moved from one data set to the other data set and moving the selected member until a cost criterion is satisfied.

86. The computer-readable medium of claim 69, wherein the analysis module is further configured to determine a cache hit rate associated with the selected ordering of the members.

87. The computer-readable medium of claim 86, wherein the analysis module is further configured to determine a cache line survival probability for first and second members of the data structure using the selected ordering of the members by:
determining an offset factor associated with the selected ordering of the members;
scanning the trace data;
while scanning the trace data, simulating a plurality of memory accesses in the cache;
for each memory access, translating an address of the member accessed to an address in the selected ordering using the offset factor;
counting, as a first quantity, a number of occurrences during the simulation in which a cache line on which the first member resides is in the cache when the second member is accessed immediately after the first member;
counting, as a second quantity, a number of occurrences during the simulation in which the second member is accessed immediately after the first member; and
dividing the first quantity by the second quantity to obtain the cache line survival probability.

* * * * *

UNITED STATES PATENT AND TRADEMARK OFFICE
CERTIFICATE OF CORRECTION

PATENT NO. : 6,678,805 B1
DATED : January 13, 2004
INVENTOR(S) : Corduneanu et al.

It is certified that error appears in the above-identified patent and that said Letters Patent is hereby corrected as shown below:

Column 1,
Line 49, "structure spas" should read -- structure spans --.

Column 17,
Line 57, "algorithm that, determines" should read -- algorithm that determines --.

Signed and Sealed this

Fifteenth Day of June, 2004

JON W. DUDAS
*Acting Director of the United States Patent and Trademark Office*